M. F. GRAVES.
Ice-Cream Freezers.
No. 143,822. Patented Oct. 21, 1873.
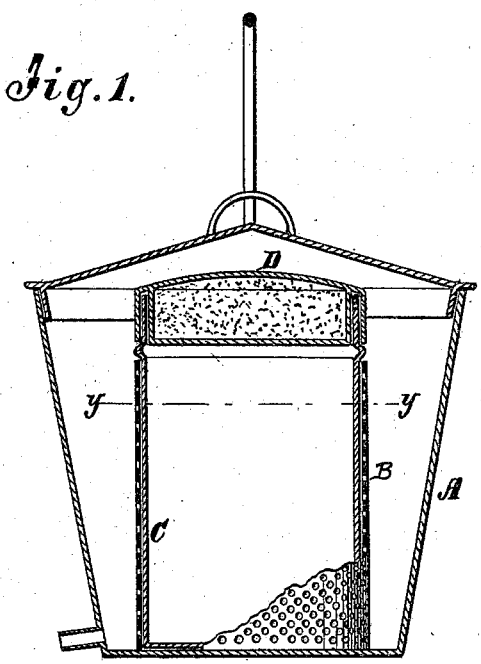
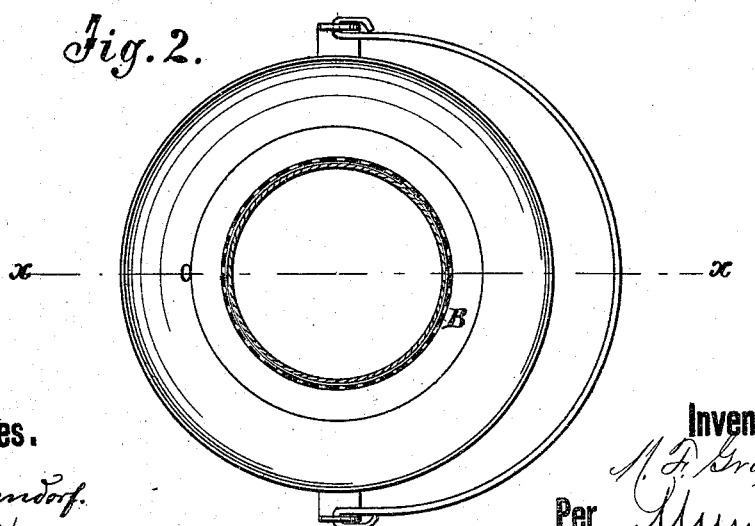
Witnesses.
A. Bennenendorf.
O. Silquick
Inventor.
M. F. Graves
Per Munn & Co.
Attorneys.

UNITED STATES PATENT OFFICE.

MILLER F. GRAVES, OF SUNBURY, PENNSYLVANIA.

IMPROVEMENT IN ICE-CREAM FREEZERS.

Specification forming part of Letters Patent No. 143,822, dated October 21, 1873; application filed August 9, 1873.

*To all whom it may concern:*

Be it known that I, MILLER F. GRAVES, of Sunbury, in the county of Northumberland and State of Pennsylvania, have invented a new and Improved Ice-Cream Preserver, of which the following is a specification:

The invention will first be fully described, and then clearly pointed out in the claim.

The object is to provide dealers in ice-cream preserving and delivering pails or tubs, in which cans of frozen cream can be readily placed and conveyed to customers with greater dispatch and convenience than can be done with the ordinary cans or pails used for that purpose, which necessitate the repacking of the ice each time a can of cream is to be put in the delivering-pail.

Figure 1 is a sectional elevation of my improved ice-cream preserver, taken on the line $x\ x$ of Fig. 2. Fig. 2 is a horizontal section taken on the line $y\ y$ of Fig. 1.

Similar letters of reference indicate corresponding parts.

A is the pail, bucket, or other suitable vessel, in which I make a stationary tube, curb, or guard, B, of perforated sheet metal, screen-wire, or other suitable substance, placing the same at the center, and extending it nearly as high as the top of the pail, and making it large enough to receive the cream-can C, which I provide with a non-conducting cover, D, lined with charcoal or any equivalent substance.

The ice is packed in the space between the guard B and the shell of the pail A, and is, by the curb, prevented from filling up the center of the pail when the cream-can is taken out, so that as many cans can be put in and taken out as may be desired, without repacking the ice. The said guard also prevents freezing a crust around the cream by the little air-space between the ice and cream-can, which is afforded by said guard.

Having thus described my invention, I claim as new and desire to secure by Letters Patent—

The tube B, placed between the ice and cream-vessel, reticulated or side-perforated, as and for the purpose described.

MILLER F. GRAVES.

Witnesses:
S. J. PACKER,
A. TUTTLE.